United States Patent [19]

Le Viet et al.

[11] Patent Number: 5,149,556
[45] Date of Patent: Sep. 22, 1992

[54] PROCESS FOR PASTEURIZING AND PRECOOKING UNCOOKED PIZZA BASES

[75] Inventors: Toai Le Viet, Vevey; Eberhard Raetz, Corseaux, both of Switzerland

[73] Assignee: Nestec S.A., Vevey, Switzerland

[21] Appl. No.: 518,162

[22] Filed: May 3, 1990

[30] Foreign Application Priority Data

May 22, 1989 [CH] Switzerland .......................... 1920/89

[51] Int. Cl.⁵ .............................................. A23L 3/01
[52] U.S. Cl. ...................................... 426/521; 426/243; 426/505; 426/523; 99/423; 99/451; 219/10.55 E
[58] Field of Search ............... 426/107, 113, 234, 243, 426/523, 505, 521; 99/14, 451; 219/10.55 E

[56] References Cited

U.S. PATENT DOCUMENTS

| | | | |
|---|---|---|---|
| 4,367,243 | 1/1983 | Brummet et al. | 426/505 |
| 4,687,895 | 8/1987 | Chitre et al. | 426/451 |
| 4,818,831 | 4/1989 | Seabourne | 426/113 |
| 4,923,704 | 5/1990 | Levinson | 426/243 |

Primary Examiner—Jeanette Hunter
Assistant Examiner—Helen Prah
Attorney, Agent, or Firm—Vogt & O'Donnell

[57] ABSTRACT

A raw pizza base is pasteurized and precooked by heating a vitroceramic plate by microwaves to bring the plate to a temperature of from 250° C. to 300° C., removing the plate from the microwaves, placing a raw pizza base on the heated vitroceramic plate for from about 2 minutes to about 3 minutes to pasteurize and precook the pizza base in contact with the vitroceramic plate, and then the pizza base is removed from the vitroceramic plate.

11 Claims, 1 Drawing Sheet

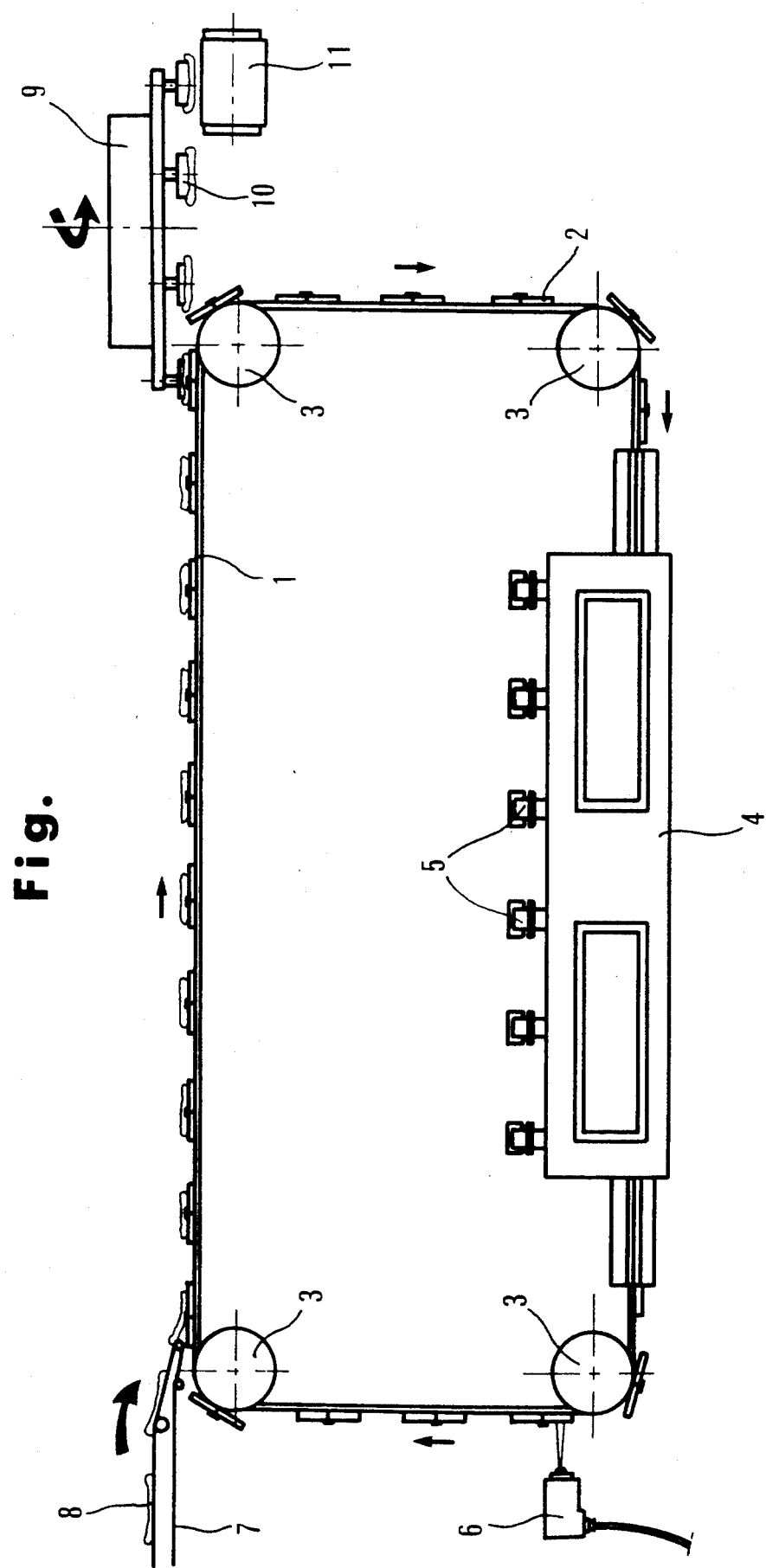

PROCESS FOR PASTEURIZING AND PRECOOKING UNCOOKED PIZZA BASES

BACKGROUND OF THE INVENTION

This invention relates to a process for pasteurizing and precooking raw (or uncooked) pizza bases. The invention also relates to an arrangement for carrying out this process.

To cook deep-frozen pizzas, the consumer may be presented with two possibilities. The first comprises filling a raw pizza base, freezing the pizza and cooking it before eating. The problem with non-precooked pizzas is that commercially available domestic ovens rarely permit correct, i.e., adequate, cooking of the pizzas because they generally do not enable temperatures high enough for proper cooking of the pizza dough to be reached. On the other hand, because the pizzas are only cooked once, there is no risk of the dough drying out.

To avoid the above-mentioned problem of inadequate cooking, the raw dough is generally precooked at the factory in conventional ovens applying convection and contact heat which has the disadvantage of drying particularly the edges of the dough not covered by filling or sauce. This phenomenon is further aggravated when the pizza is cooked for the second time during final preparation in a domestic oven.

SUMMARY OF THE INVENTION

The object of the present invention is partly to precook a pizza base with a temperature gradient in the dough which enables a product of satisfactory quality to be obtained during final cooking in a domestic oven while, at the same time, avoiding excessive evaporation of water from the dough which would result in drying out of the edges not covered by the filling or the sauce. In addition, the present invention allows satisfactory pasteurization for distribution of the pizza by refrigerated transport.

The present invention relates to a process for pasteurizing and precooking raw pizza bases in which a vitroceramic plate is heated by microwaves to bring it to a temperature of 250° to 300° C., the plate is then removed from the microwave field and the pizza base is placed on the plate for about 2 to 3 minutes and then the pasteurized and precooked pizza base is removed from the plate.

DETAILED DESCRIPTION OF THE INVENTION

According to the invention, the pizza base is precooked solely by underneath contact in a cold atmosphere.

The vitroceramic plate used must have a high absorption capacity for microwaves, i.e., it must enable the desired temperature to be reached in a short time. In addition, the vitroceramic plate used must have a high energy transfer coefficient. Plates of the CERAN type (Schott) or the PYROCERAM type (Dow Corning) are preferably used. These plates contain iron oxides and/or carbon fibers. They may of course contain other metal oxides which absorb microwaves.

If the pizza bases are left on the preheated vitroceramic plates for between 2 and 3 minutes, the surface directly in contact with the plate turns brown and is precooked, assuming a crispy character. However, the second advantage of this residence time on the plate is that it enables the pizza base to be pasteurized. This is because, after the 2 or 3 minutes, the dough in direct contact with the plate reaches a temperature of approximately 200° C. while the upper surface of the pizza base is at a temperature of approximately 90° C. This corresponds to a good pasteurization temperature. The effect of the pasteurization is to stop the activity of the yeast. Experiments have shown that precooking in accordance with the invention enables the germ content to be reduced to an acceptable level for a pasteurized product.

Accordingly, several uses may be envisaged for the pizza base thus treated. Thus, it may be filled, frozen and packed, which gives a precooked product useable with a standard pack which may then be cooked by the consumer in a conventional or microwave oven. Alternatively, it may be used without a filling in so-called fast-food catering. It is also possible to fill the pizza base intended for sale as a refrigerated product. Since the pizza thus obtained is pasteurized, it will keep for a fortnight in a refrigerator.

In one preferred embodiment of the process according to the invention, the vitroceramic plate is heated to between 270° and 280° C. and, after removal of the plate from the microwave field, the pizza base is placed thereon for about 2.5 minutes.

The pizza dough is prepared in the conventional manner with flour, water and yeast.

The power output of the oven used to heat the vitroceramic plates is not critical, although an oven having a power output of 5 KWatts with several microwave generators is preferably used.

The invention also relates to an arrangement for carrying out the process, comprising a conveyor belt with a plurality of vitroceramic plates and with a zone in which it passes through a microwave tunnel and a zone in which it passes through open air. The microwave tunnel comprises between three and seven microwave generators each having an output of the order of 5 KWatts.

The conveyor belt circulates at a speed of 1 to 3 m/minute. A good precooking effect is obtained with a vitroceramic plate having a thickness of 4 to 10 mm and preferably of the order of 8 mm. By means of this arrangement, precooked pizza bases can be continuously prepared and are pasteurized without an oven.

It is thus possible to avoid the disadvantage attending the conventional pasteurization of dough, namely its excessive expansion when it is in a hot oven.

The invention is described in more detail in the following with reference to the accompanying drawing which diagrammatically illustrates the arrangement according to the invention.

BRIEF DESCRIPTION OF THE DRAWING

FIG. 1 is a schematic depiction of an apparatus for carrying out the process of the present invention.

DETAILED DESCRIPTION OF THE DRAWING

The conveyor (1) comprises vitroceramic plates (2) and circulates in a closed loop in the arrowed direction around reversing rollers (3). The microwave tunnel (4) comprises six microwave generators (5). At the exit of the microwave tunnel there is an infrared thermometer (6).

In operation, the microwave generators are switched on together with the conveyor belt which, initially, is empty. When the thermometer (6) detects a temperature of the order of 270° C.–280° C. on the vitroceramic plates, the conveyor belt (7) begins to circulate and brings the raw pizza bases (8) onto the vitroceramic plates. Precooking takes place in the section between the two successive reversing rollers (3). At the end of that section, a carousel (9) in the form of circular plates (10) removes the pizza bases and transfers them to the conveyor belt (11) for filling, packaging and freezing.

We claim:

1. A process for obtaining a pasteurized and precooked pizza base comprising heating a vitroceramic plate by microwaves to heat the vitroceramic plate to a temperature of from 250° C. to 300° C., removing the heated vitroceramic plate from the microwaves, placing a raw pizza base on the heated vitroceramic plate removed from the microwaves for from about 2 minutes to about 3 minutes to pasteurize and precook the pizza base in contact with the vitroceramic plate and then removing the pasteurized and precooked pizza base from the vitroceramic plate.

2. A process according to claim 1 wherein the vitroceramic plate is heated to a temperature of from 270° C. to 280° C.

3. A process according to claim 2 wherein the pizza base is precooked and pasteurized by the vitroceramic plate for about 2.5 minutes.

4. A process according to claim 1 wherein the vitroceramic plate contains metal oxides which absorb microwaves.

5. A process according to claim 1 wherein the vitroceramic plate contains iron oxides.

6. A process according to claim 1 wherein the vitroceramic plate contains carbon fibers.

7. A process according to claim 1 wherein the vitroceramic plate contains iron oxides and carbon fibers.

8. A process according to claim 1 wherein the vitroceramic plate has a thickness of from 4 mm to 10 mm.

9. A process according to claim 1 further comprising conveying a plurality of vitroceramic plates to and through the microwaves to heat the plates and then removing the heated plates from the microwaves, conveying a plurality of raw pizza bases to the heated plates removed from the microwaves, placing the raw pizza bases on the heated plates removed from the microwaves and conveying the pizza bases on the heated plate removed from the microwaves for from about 2 minutes to about 3 minutes to pasteurize and precook the pizza bases and then removing the pasteurized and precooked pizza bases from the plates.

10. A process according to claim 9 wherein the vitroceramic plates are conveyed in a closed loop.

11. A process according to claim 9 wherein the vitroceramic plates have a thickness of from 4 mm to 10 mm and are conveyed at a speed from 1 m/minute to 3 m/minute.

* * * * *

UNITED STATES PATENT AND TRADEMARK OFFICE
CERTIFICATE OF CORRECTION

PATENT NO. : 5,149,556
DATED : September 22, 1992
INVENTOR(S) : Toai LE VIET, et al.

It is certified that error appears in the above-identified patent and that said Letters Patent is hereby corrected as shown below:

Column 2, line 60, after "conveyor", insert --belt--.

Column 4, line 20 [line 9 of claim 9], "plate" should be --plates--.

Column 4, line 28 [line 3 of claim 11], after "speed", insert --of--.

Signed and Sealed this

Seventh Day of September, 1993

Attest:

BRUCE LEHMAN

*Attesting Officer*    *Commissioner of Patents and Trademarks*